United States Patent
Neogi et al.

(10) Patent No.: US 11,176,466 B2
(45) Date of Patent: Nov. 16, 2021

(54) ENHANCED CONVERSATIONAL BOTS PROCESSING

(71) Applicant: International Business Machines Corporation, Armonk, NY (US)

(72) Inventors: Sandipto Neogi, Bangalore (IN); Simardeep S. Arneja, Bangalore (IN); Arnika Kumar, Thane (IN); Yash Vardhan Singh, Bangalore (IN); Sudarsan Lakshminarayanan, Bangalore (IN); Ashish Rao, Bangalore (IN); Mandar Mutalikdesai, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/242,437

(22) Filed: Jan. 8, 2019

(65) Prior Publication Data

US 2020/0218995 A1 Jul. 9, 2020

(51) Int. Cl.
*G06F 17/00* (2019.01)
*G06N 5/04* (2006.01)
(Continued)

(52) U.S. Cl.
CPC .......... *G06N 5/04* (2013.01); *G06F 16/9024* (2019.01); *G10L 15/22* (2013.01); *G10L 2015/225* (2013.01)

(58) Field of Classification Search
CPC ...... G06F 16/9535; G06F 16/68; G06F 40/30; G06F 16/3322; G06F 16/90324; G06F 16/90332; G06F 16/24; G06F 16/24578; G06F 16/3329; G06F 16/335; G06F 16/367; G06F 16/738; G06F 16/7867; G06F 16/219; G06F 16/2455; G06F 16/2465;
(Continued)

(56) References Cited

U.S. PATENT DOCUMENTS

| 8,942,986 B2 | 1/2015 | Cheyer et al. |
| 9,558,740 B1 | 1/2017 | Mairesse et al. |

(Continued)

OTHER PUBLICATIONS

Kang, S. J., Lee, J. H.: Ontology-Based Word Sense Disambiguation by Using Semi-Automatically Constructed Ontology. In Proceedings of MT Summit VIII, Santialgo de Compostela, Galicia, Spain (Year: 2001).*

(Continued)

*Primary Examiner* — Michael Ortiz-Sanchez
(74) *Attorney, Agent, or Firm* — Scott S. Dobson; Hunter E. Webb; Keohane & D'Alessandro, PLLC (57) ABSTRACT

An approach for enhancing user communication with a chatbot is provided. In an embodiment, a communication from a user using a chatbot application is received. One or more intents related to the user communication are identified, with each intent having a respective confidence score. Further, any number of attributes related to the user communication are extracted. If multiple viable intents are found (e.g., intents having a confidence score exceeding a predefined threshold), then relationships between the extracted attributes are derived to establish a context. Based on the context, a disambiguation question is generated to clarify an actual intent of the user.

20 Claims, 5 Drawing Sheets

(51) Int. Cl.
G06F 16/901 (2019.01)
G10L 15/22 (2006.01)

(58) Field of Classification Search
CPC .......... G06F 40/20; G06F 9/453; G06F 16/00;
G06F 16/245; G06F 11/3438; G06F
16/24575; G06F 16/48; G06F 16/907;
G06F 16/95; G06F 16/2453; G06F 16/55;
G06F 16/9024; G06F 16/243; G06F
16/24534; G06F 16/285; G06F 16/906;
G10L 15/22; G10L 15/1815; G10L 15/26;
G10L 15/1822; G10L 15/16; G10L
15/265; G10L 2015/223; G10L 15/18;
G10L 2015/225; G06N 20/00; G06Q
50/01; G06Q 10/101
See application file for complete search history.

(56) References Cited

U.S. PATENT DOCUMENTS

| | | | |
|---|---|---|---|
| 9,668,024 B2 | 5/2017 | Os et al. | |
| 2006/0190256 A1* | 8/2006 | Stephanick | G06F 40/242 |
| | | | 704/252 |
| 2011/0320454 A1* | 12/2011 | Hill | G06N 20/00 |
| | | | 707/739 |
| 2012/0330869 A1* | 12/2012 | Durham | G06N 5/022 |
| | | | 706/16 |
| 2013/0262114 A1* | 10/2013 | Brockett | G10L 15/18 |
| | | | 704/243 |
| 2014/0039895 A1* | 2/2014 | Aravamudan | G06F 16/683 |
| | | | 704/257 |
| 2014/0040274 A1* | 2/2014 | Aravamudan | G06F 16/3322 |
| | | | 707/741 |
| 2014/0181100 A1* | 6/2014 | Ramer | G06F 3/0236 |
| | | | 707/728 |
| 2014/0279906 A1* | 9/2014 | Peintner | G06Q 30/0201 |
| | | | 707/639 |
| 2015/0286747 A1* | 10/2015 | Anastasakos | G06F 16/9017 |
| | | | 707/776 |
| 2018/0314689 A1* | 11/2018 | Wang | G10L 15/22 |
| 2019/0102078 A1* | 4/2019 | Bhatt | G06F 3/04847 |
| 2019/0272296 A1* | 9/2019 | Prakash | G06F 16/243 |
| 2020/0104545 A1* | 4/2020 | Patwardhan | G06F 17/18 |
| 2020/0219617 A1* | 7/2020 | Eleftheriou | G16H 10/20 |

OTHER PUBLICATIONS

Aroyo, L. M., & Welty, C. A. (2015). Crowd Truth: Harnessing disagreement in crowdsourcing a relation extraction gold standard. In ACM Web Science 2013 (Year: 2013).*

Serban, I. V., Sankar, C., Germain, M., Zhang, S., Lin, Z., Subramanian, S., Kim, T., Pieper, M., Chandar, S., Ke, N. R., Mudumba, S., de Brebisson, A., Sotelo, J. M. R., Suhubdy, D., Michalski, V., Nguyen, A., Pineau, J., and Bengio, Y. (2017). A Deep Reinforcement Learning Chatbot. ArXiv e-prints. (Year: 2017).*

* cited by examiner

ENHANCED CONVERSATIONAL BOTS PROCESSING

BACKGROUND

In general, embodiments of the present invention relate to automated communication systems. Specifically, embodiments of the present invention relate to an approach for enhancing user input communication with a conversational bot.

In today's information technology environment, conversational bots, or "chatbots", are becoming increasingly popular as an interesting and interactive medium for providing information. Derived from "chat robot", chatbots allow for highly engaging conversational experiences, through voice and text, that can be customized and used on mobile devices, web browsers, and on popular chat platforms. With the advent of deep learning technologies such as text-to-speech, automatic speech recognition, and natural language processing, chatbots that simulate human conversation and dialogue can now be found in call center and customer service workflows, DevOps management, and as personal assistants.

In a simple example, a chatbot may replace a text-based FAQ (frequently asked questions) facility on a web site. FAQ facilities generally provide a list of frequently asked questions and invite a user to select one of them. Then the user is automatically presented an answer. While this serves the purpose of conveying information, it may be dull and limited to the questions presented. By contrast, a chatbot provides a conversational experience for interaction with users. The user can type or speak a question and the chatbot will attempt to interpret it, and then provide an answer. In the context of the FAQ facility, if the user submits one of the frequently asked questions using words the same as or similar to the question, typically the chatbot will provide the prepared text answer, exactly like the text-based facility but in the context of chat.

However, chatbots can provide many additional benefits. For example, chatbots can be integrated with enterprise backend systems (e.g., customer relationship management, inventory management program, human resources system, etc.) to check sales numbers, marketing performance, inventory status, perform employee onboarding, etc., to improve business productivity. As a personal assistant, chatbots can simplify and expedite the process of everyday personal activities such as ordering new shoes or groceries, booking medical appointments, or making travel reservations, from a mobile device, browser, or favorite chat platform. Using a chatbot in a call center application, business customers can perform tasks such as changing a password, requesting a balance on an account, or scheduling an appointment, without the need to speak to an agent.

SUMMARY

In general, an approach for enhancing user input communication with a chatbot is provided. In an embodiment, a communication from a user using a chatbot application is received. One or more intents related to the user communication are identified, with each intent having a respective confidence score. Further, any number of attributes related to the user communication are extracted. If multiple viable intents are found (e.g., intents having a confidence score exceeding a predefined threshold), then relationships between the extracted attributes are derived. A disambiguation question is generated, based on the relationships, to clarify an actual intent of the user.

A first aspect of the present invention provides a computer-implemented method for enhancing user communication with a chatbot, comprising: receiving a user communication; identifying one or more intents related to the user communication; extracting a plurality of attributes associated with the user communication; identifying, when an ambiguity in the user communication exists, a plurality of relationships between the extracted attributes using a co-occurrence graph; and generating, based on the plurality of relationships, a disambiguating question to clarify a user intent of the user communication.

A second aspect of the present invention provides a computer program product for enhancing user communication with a chatbot, the computer program product comprising a computer readable storage media, and program instructions stored on the computer readable storage media, that cause at least one computer device to: receive a user communication; identify one or more intents related to the user communication; extract a plurality of attributes associated with the user communication; identify, when an ambiguity in the user communication exists, a plurality of relationships between the extracted attributes using a co-occurrence graph; and generate, based on the plurality of relationships, a disambiguating question to clarify a user intent of the user communication.

A third aspect of the present invention provides a computer system for enhancing user communication with a chatbot, comprising: a memory medium comprising instructions; a bus coupled to the memory medium; and a processor coupled to the bus that when executing the instructions causes the system to: receive a user communication; identify one or more intents related to the user communication; extract a plurality of attributes associated with the user communication; identify, when an ambiguity in the user communication exists, a plurality of relationships between the extracted attributes using a co-occurrence graph; and generate, based on the plurality of relationships, a disambiguating question to clarify a user intent of the user communication.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for enhancing user communication with a chatbot. In an embodiment, a communication from a user using a chatbot application is received. One or more intents related to the user communication are identified, with each intent having a respective confidence score. Further, any number of attributes related to the user communication are extracted. If multiple viable intents are found (e.g., intents having a confidence score exceeding a predefined threshold), then relationships between the extracted attributes are derived. A disambiguation question is generated, based on the relationships, to clarify an actual intent of the user.

Figure 1:
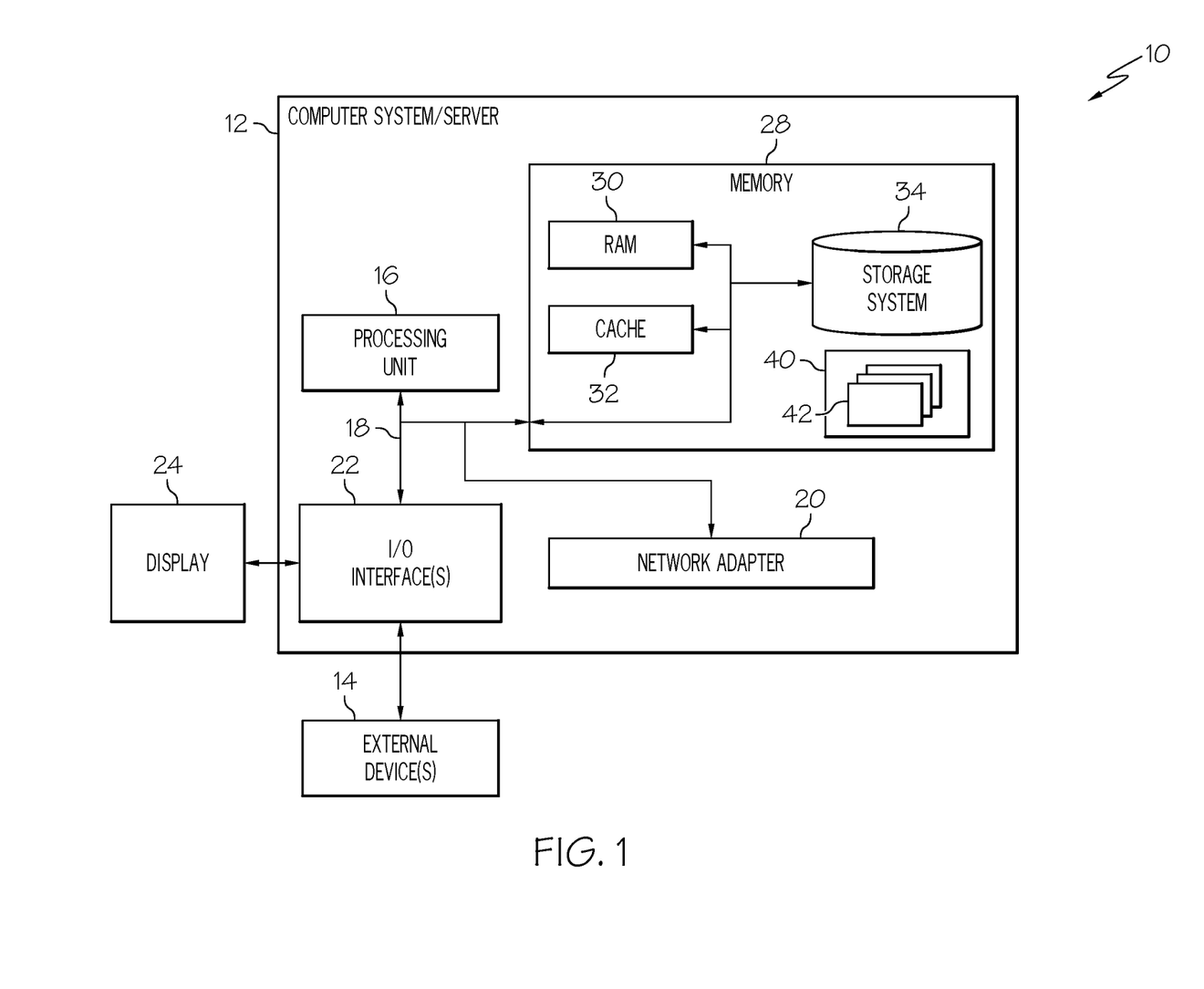
FIG. 1 depicts a computing environment according to an embodiment of the present invention.

Referring now to FIG. 1, a schematic of an example of a computing environment is shown. Computing environment 10 is only one example of a suitable computing environment and is not intended to suggest any limitation as to the scope of use or functionality of embodiments of the invention described herein. Regardless, computing environment 10 is capable of being implemented and/or performing any of the functionality set forth hereinabove.

In computing environment 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing environment 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, and/or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
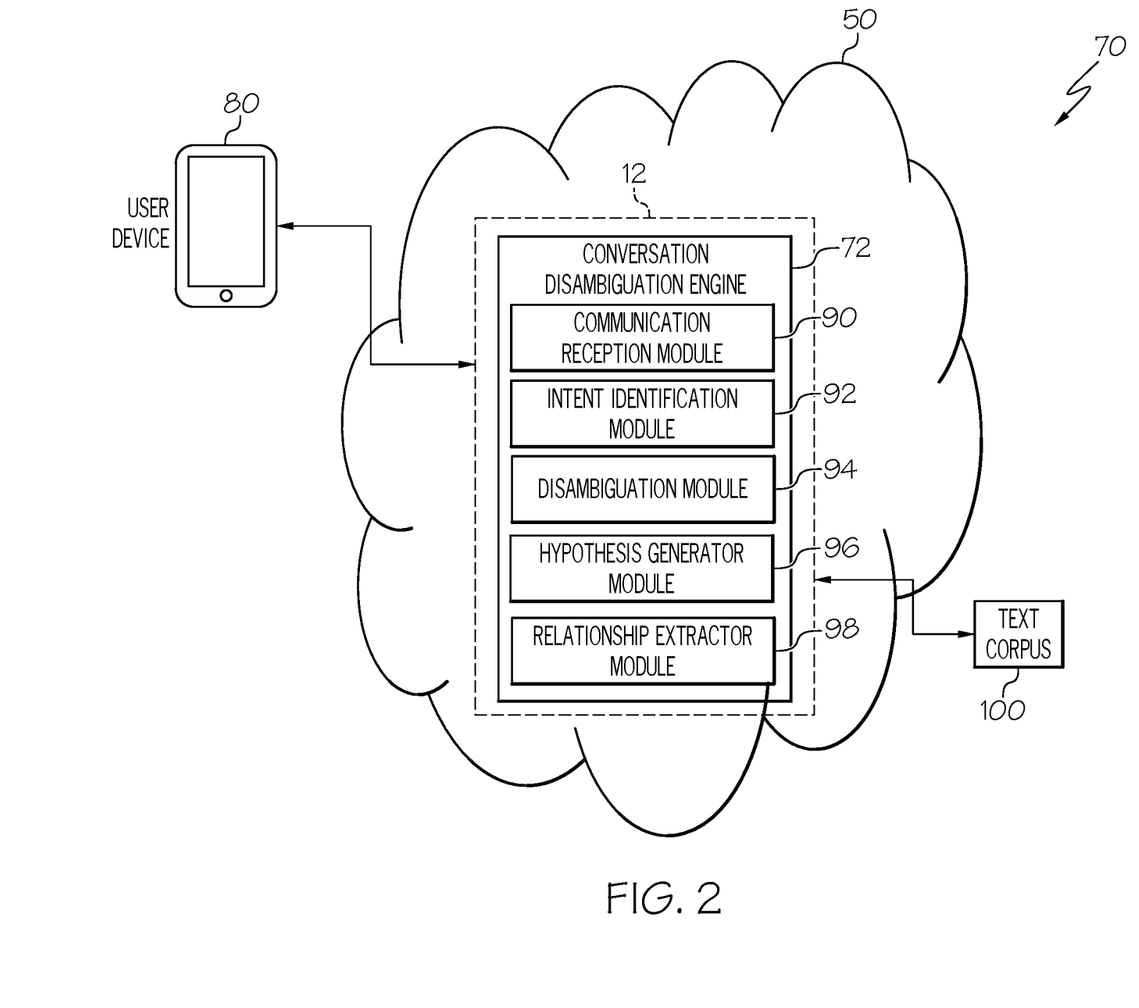
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have a conversation disambiguation engine (hereinafter "system 72"). Rather, system 72 could be loaded on a server or server-capable device that communicates (e.g., wirelessly) with client machines to provide conversation disambiguation therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to conversation disambiguation in a networked computing environment. Such other system(s) have not been shown in FIG. 2 for brevity purposes.

Along these lines, system 72 may perform multiple functions similar to a general-purpose computer. Specifically, among other functions, system 72 can generate a trained neural network 82. To accomplish this, system 72 can include: a communication reception module 90, an intent identification module 92, a disambiguation module 94, a hypothesis generator module 96, and a relationship extractor module 98. Although the functionality of system 72 is shown in FIG. 2 as including both a client-side portion and a server-side portion, in some examples, the functions of system 72 can be implemented as a standalone application installed on user device 80, such as a smartphone, tablet, or the like. In addition, the division of functionalities between the client and server portions of conversational disambiguation can vary in different examples. For instance, in some examples, the client executed on user device 80 can be a thin client that provides only user-facing input and output processing functions, and delegates all other functionalities of system 72 to a backend server.

The inventors of the invention described herein have discovered certain deficiencies in the current solutions for interacting with a communication agent or chatbot. To interact efficiently with a user, a chatbot needs to derive a content and context of a conversation. However, the inventors have found that current chatbots have limitations when it comes to identifying responses to an ambiguous user communication and may not provide an appropriate response. When a user asks a question which can have more than one meaning, it leads to ambiguities making it difficult for a chatbot to understand the correct intent. For example, if the user says, "I am scared of moving to Java", the chatbot may have difficulty determining whether the user is talking about Java the Indonesian island or the programming language. Unless a disambiguating question is asked to interpret a meaning, the chatbot may be unable to determine the user's intent. In this example, the user meant moving to the island of Java which the chatbot could not understand. If a proper disambiguating question such as "Did you mean Java the island or Java the programming language?" is asked, then the above issue can be averted.

Additionally, in a typed communication, words can be misspelled. For example, a user may type "I take a local trn to work. When is the next trn to my office?" using a chatbot. The chatbot may be unable to make the connection that "trn" actually means "train" here. The user may also make use of homophonic words (i.e., words that have the same pronunciation but are in fact different) such as "peace" and "piece". Such words can make it difficult for the chatbot to understand the communication. A misinterpretation of intent can lead to a diminished user experience, leading to lower usage and possibly a discontinuation of the chatbot. This is contradictory to the purpose of using these types of communication agents. Chatbots are often meant to deflect frequently asked questions from human agents in order to reduce cost and improve the availability of self-service systems. In this disclosure, the inventors address the problem by asking, using a co-occurrence graph and/or ontology derived from a user communication, one or more disambiguating questions to assist in identifying a correct intent behind the user communication.

A user provides a user communication in a natural language format. The input may be text input or voice input provided through various application interfaces (e.g., microphone, touchscreen, keyboard, etc.) of user device 80. Speech-to-text technology can be used to transcribe voice input, as it is being received by an audio interface, to text for ease of later processing. The user interface can be capable of accepting a user communication at least partially in the form of a natural language command, request, statement, narrative, and/or inquiry. As used herein, a user communication can include, but is not limited to, a question, command, statement, and/or the like. Typically, the user communication seeks either an informational answer or performance of a task (e.g., causing display of particular media). A satisfactory response to the user communication can include provision of the requested informational answer, performance of the requested task, or a combination of the two. For example, a user can ask a question, such as "Where am I right now?" Based on the user's current location, an answer such as "You are in Central Park" can be provided. The user can also request the performance of a task, for example, "Please remind me to call mom at 4 p.m. today." In response, an appropriate reminder item created in the user's electronic schedule.

Referring again to FIG. 2, communication reception module 90 of system 72, as executed by computer system/server 12, is configured to receive a user communication from an application interface of user device 80. Typically, the user communication will be received as text for ease of processing. In an embodiment, communication reception module 90 can be further configured to perform one or more additional editing functions on the user communication once it has been received. For example, communication reception module 90 can correct any spelling errors, remove any predefined special characters, etc. to assist in further processing of the user communication.

Intent identification module 92 of system 72, as executed by computer system/server 12, is configured to identify a user intent (hereinafter, referred to as "intents") from a user communication. To be useful, a chatbot must respond appropriately to natural language input. A chatbot detects what a user wants to do by identifying their intent. The intent maps a user communication to actions that the chatbot takes, such as invoking a dialog. A chatbot may also need to extract attributes, which are important words in a user communication. Attributes may include, but are not limited to, any number of real-world objects or entities, numerical values (e.g., weight, distance, dollar amount, etc.), non-linguistic tokens (e.g., a specific bank machine number), and/or the like. Sometimes attributes are required to fulfill an intent. In an embodiment, intent identification module 92 may employ natural language processing techniques, now known or later developed, to identify user intent. Natural language processing is designed to free users from having to know arcane syntax and specialized command structures in order to communicate with electronic devices, such as user device 80.

This feature of natural language processing is particularly useful in the context of chatbots, because different people will formulate requests in different ways, and the chatbot should be flexible enough to understand the user's intent regardless of the particular syntax or wording of a request. For example, a chatbot should be able to infer that speech inputs such as "set an alarm for six a.m." and "wake me up tomorrow at six in the morning" are both requesting the same action. Natural language processing allows a chatbot to infer a user's intent by attempting to understand the meaning of the input, rather than by simply processing commands that are input according to a known syntax or command structure.

However, at times, it may be difficult (or impossible) to determine a single intent from a user communication. Consider the following exchange between a user and financial chatbot:

Bot: How can I help you?
User: What are the steps for background check? (question 1)
Bot: {answers provided} (answer 1)
User: Can I bank on these checks? (question 2)

Question 2 is ambiguous as to user intent. If the term "bank" is interpreted as a financial institution, then the term refers to a financial instrument. However, if the term "bank" is used to mean "rely", then the term means verification. Additionally, if the user has been issued checks (i.e., financial instruments), then question 2 could mean "are these checks reliable?" In this case, steps to ascertain a single intent are necessary prior to providing an adequate response.

In a nutshell, when given a textual user input, an intent detected behind the user communication, that is, what the user intends to ask about, is returned. The chatbot also detects the different attributes that appear in the user communication. Additionally, it outputs a confidence score for each intent with attributes detected. For example, those are numbers can be in the range [0, 1], with 1 indicating the most confidence about the detection and 0 being the least confident about it. However, an ambiguity can be said to exist when multiple viable intents can be inferred from a given user communication. A viable intent can be defined as an identified intent having a confidence score exceeding a predefined threshold value. As stated, multiple intents may be returned, each having a respective confidence score. The current invention enhances the intent identification process described above by generating any number of disambiguating questions needed to clarify user intent (e.g., identify actual intent) in order to provide an appropriate response to a user communication, as described below.

Disambiguation module 94 of system 72, as executed by computer system/server 12, is configured to generate one or more disambiguation questions to identify an actual intent of a user communication. An ambiguity exists when multiple viable intents are inferred from a given user communication. Then, an actual intent must be determined for the user communication in order for the chatbot to respond appropriately. Referring back to the financial chatbot example, the word "bank" has different meanings in different contexts. To that end, relationships between the attributes identified in a user communication are mined using a co-occurrence graph and/or ontology to generate one or more disambiguation questions to determine what the user meant. In addition, additional relationships between user communications may also be identified. These relationships can be used to generate disambiguating questions in order to identify an actual intent of the user.

Co-occurrence graphs (also known as co-occurrence networks) can be created for any given terms in a user communication in relation to a text corpus (e.g, text corpus 100). Co-occurring pairs of terms can be called "neighbors" and these often group into "neighborhoods" based on their interconnections. Individual terms may have several neighbors. Neighborhoods may connect to one another through at least one individual term or may remain unconnected. Individual terms are, within the context of text mining, symbolically represented as text strings. In the real world, the entity identified by a term normally has several symbolic representations. It is therefore useful to consider terms as being represented by one primary symbol and up to several synonymous alternative symbols. Occurrence of an individual term is established by searching for each known symbolic representations of the term. The process can be augmented through NLP (natural language processing) algorithms that interrogate segments of text for possible alternatives such as word order, spacing, and hyphenation. NLP can also be used to identify sentence structure and categorize text strings according to grammar.

Figure 3:
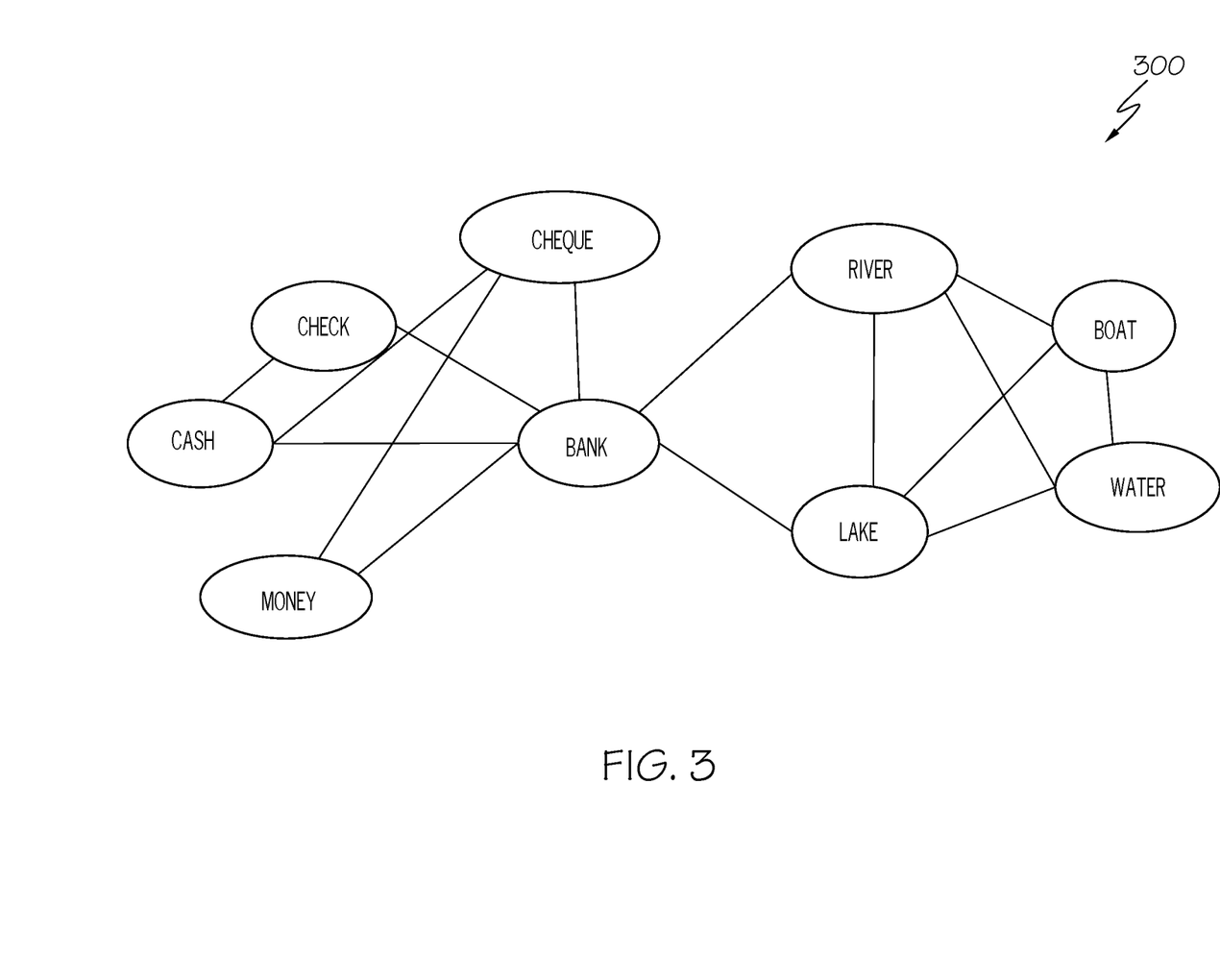
FIG. 3 depicts an example co-occurrence graph according to an embodiment of the present invention.

Graphic representation of co-occurrence graphs, such as FIG. 3, allow them to be visualized and inferences drawn regarding relationships between attributes represented by the terms in the user communication applied to text corpus 100. Meaningful visualization normally requires simplifications of the graph. For example, graphs may be drawn such that the number of neighbors connecting to each term is limited. The criteria for limiting neighbors might be based on the absolute number of co-occurrences or more subtle criteria such as "probability" of co-occurrence or the presence of an intervening descriptive term. Quantitative aspects of the underlying structure of a co-occurrence graph might also be informative, such as the overall number of connections between attributes, clustering of attributes representing sub-domains, detecting synonyms, etc. These aspects can be used to disambiguate a context of the user communication.

FIG. 3 depicts an example co-occurrence graph 300 related to the term "bank". As shown, the term "bank" co-occurs with "river" as well as "check". The term "check" in turn has high co-occurrence with "cash", "money", etc. It has no co-occurrence with "river" or "lake". Hence, in this case, the term "check" is more closely related to "bank" than with "river". In certain examples, given this analysis, an intent of a user communication can be derived. However, in the financial chatbot example provided above, co-occurrence graph 300 is not informative as to determining of user intent.

Figure 4:
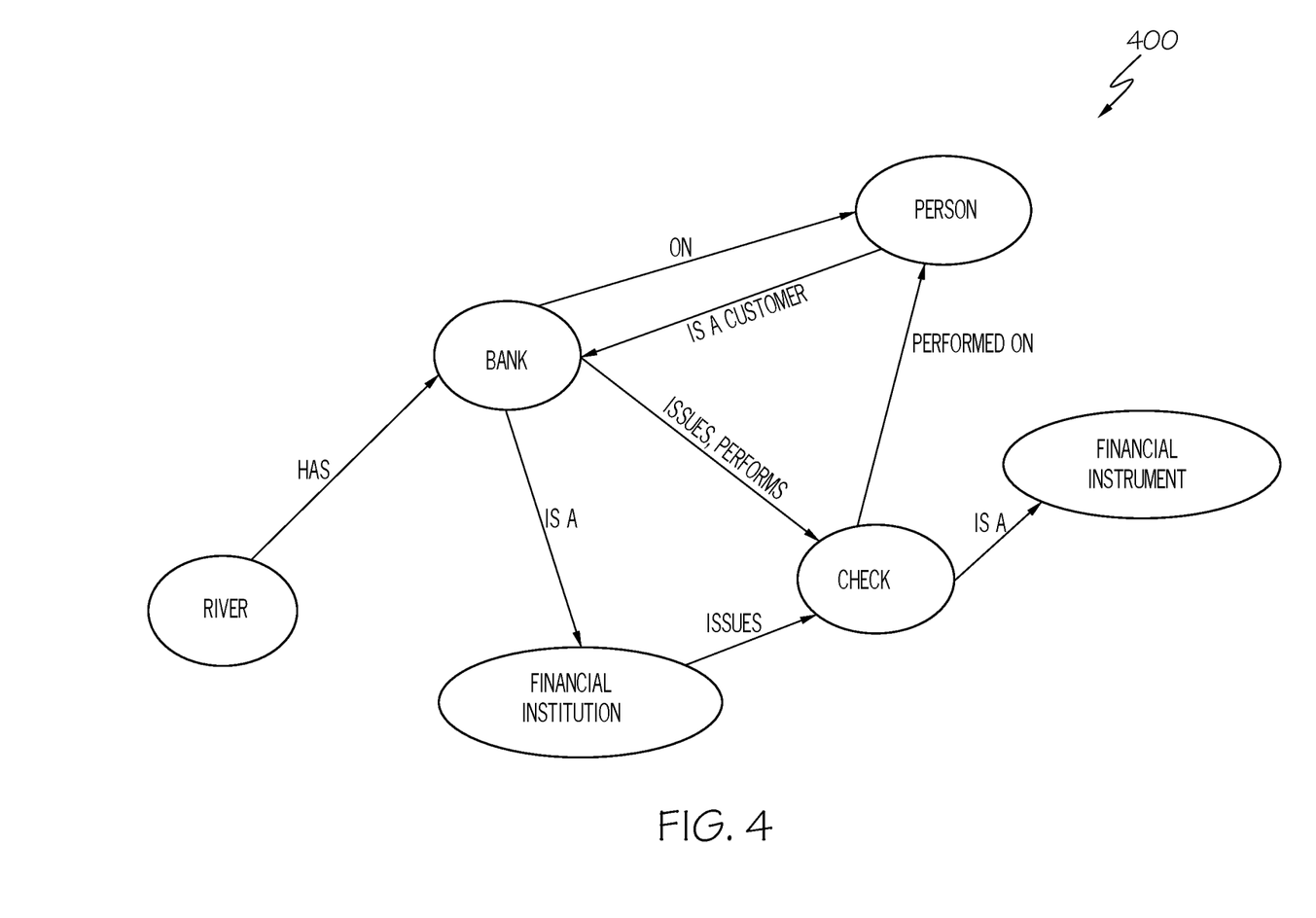
FIG. 4 depicts an example ontology graph according to an embodiment of the present invention.

FIG. 4 depicts an example ontology graph 400 related to the financial chatbot example described above. In the event that a single intent cannot be ascertained from a co-occurrence graph, an ontology graph can be used to determine an exact relationship between terms so that a user intent can be inferred. Referring back to the financial chatbot example, if a co-occurrence graph cannot comprehensively infer the meaning of the term "bank" to mean financial institution in the context of finance, ontology graph 400 may succeed in inferring this by determining that a bank is a financial institution and a financial institution issues a check.

Differences exist between disambiguating using a co-occurrence graph and an ontology. An ontology can be built by hand by a team of domain experts, where each relationship is explicitly encoded. This speaks to the authenticity of the relationships between terms in a domain. A co-occurrence graph, on the other hand, is mined from a human-generated text corpus. Therefore, the co-occurrence based relationships between terms in a domain are essentially "crowd-sourced" and not prescribed by experts. In the approach described herein, both methods are utilized: wisdom of the crowds (i.e., co-occurrence graphs) and expert annotations (i.e., ontology).

Disambiguating questions are formed from the relationships one at a time starting with the most frequent relationship (e.g., identified from a frequent item set mining approach, etc.). Disambiguation module 94 presents the disambiguating questions one at a time. The responses to these questions could be one of many options. In the above financial chatbot example, disambiguation could be done as follows:

Does the word "bank" mean "rely" or "financial institution"?

Does the word "check" mean "verification" or "financial instrument"?

The disambiguation question is presented to the user via an interface on user device 80. For example, if user device 80 is a smart phone, the disambiguating question may be audibly presented to the user. In the first question above, user device 80 would then await an answer of "rely" or "financial institution". The answer provided by the user can reduce the ambiguity and determine the context necessary to proceed further with the conversation. For example, if the user answers "rely", then the user is actually asking whether the user can rely on the background check. Based on this user intent, an adequate response can then be presented to the user. For example, an answer stating that the background check can be relied upon by the user may be transmitted to user device 80. The process of disambiguation described above is repeated until an actual intent can be identified and an adequate response is provided to the user via an interface on user device 80.

The architecture described herein provides an option of including additional modules that could aid in the functioning of the overall system. For example, the initial ontology graph could be built from an initial co-occurrence graph obtained from the set of training communications. However, during the usage of the system, new communications will be observed that would necessitate updates to the co-occurrence graph. An update of the co-occurrence graph may necessitate an update of the ontology graph. In an embodiment, the effort to update the ontology graph could be reduced by using additional modules, such as hypothesis generator module 96 and relationship extractor module 98.

In an embodiment, hypothesis generator module 96 of system 72, as executed by computer system/server 12, is configured to function as a configuration module where rules based on co-occurrence patterns can be mentioned to define a relationship. For example, to define the synonymy relationship, one might construct the following co-occurrence hypothesis: Term "a" and term "b" are synonyms if the following rules are true: (a) "a" and "b" have a low probability (as defined by a predefined threshold value) of co-occurrence, and (b) the co-occurrence neighborhoods of "a" and "b" have a significant overlap (again, as defined by a threshold value), and (c) the terms that "a" and "b" co-occur with may be synonyms in turn (making this a recursive hypothesis, which would require the use of power iterations to compute synonyms). This hypothesis can be used for building an algorithm to automatically extract synonymy relationships from a co-occurrence graph. The co-occurrence graph would be built simply by parsing text corpus 100 and identifying pairs of attributes (or entities) that occur together within the same sentence/paragraph/document.

In an embodiment, relationship extractor module 98 of system 72, as executed by computer system/server 12, is configured to function as an execution engine that builds an algorithm based on the hypotheses defined in hypothesis generator module 96, and extracts the relationships accordingly. These relationships may optionally be subjected to human review. Relationships so extracted would then be added to the ontology, which is a factual description of a domain. The ontology can be bootstrapped "top-down" either by using an off-the-shelf ontology or by building one from scratch. An ontology, once bootstrapped, can be updated from a constantly evolving co-occurrence graph. The co-occurrence graph in turn evolves as underlying text corpus 100 (relating to a domain, e.g., news articles from the financial domain, etc.) itself evolves. Text corpus 100 can be the same as the corpus used to answer long-tailed questions in the conversation service, or it could be a separate corpus. Another way in which an ontology and a co-occurrence graph can evolve is by capturing co-occurrence patterns of entities in the conversation (or a history of conversations) taking place on the chatbot.

The co-occurrence graph is built "bottom-up" by capturing pairs of co-occurring entities along with the probability (joint, as well as conditional) of their occurrence. Therefore, it is not sensitive to noise. For example, even if a mischievous user converses with the chatbot with an intent to disrupt it, the co-occurrence graph does not accord significant weightage to the terms occurring in it as they are likely to be a "one-off" case. Additionally, we might use a language model to determine whether a pair of co-occurrences makes linguistic sense, and use it to determine weights on the edges of our co-occurrence graphs. Thus, the co-occurrence graph, and subsequently the ontology, are protected from noisy conversations polluting or diluting their topical focus. The hybrid approach outlined above can transform traditional chatbots to be more aware of the context of a conversation, allow them to respond better to user communications, and improve user experience.

Figure 5:
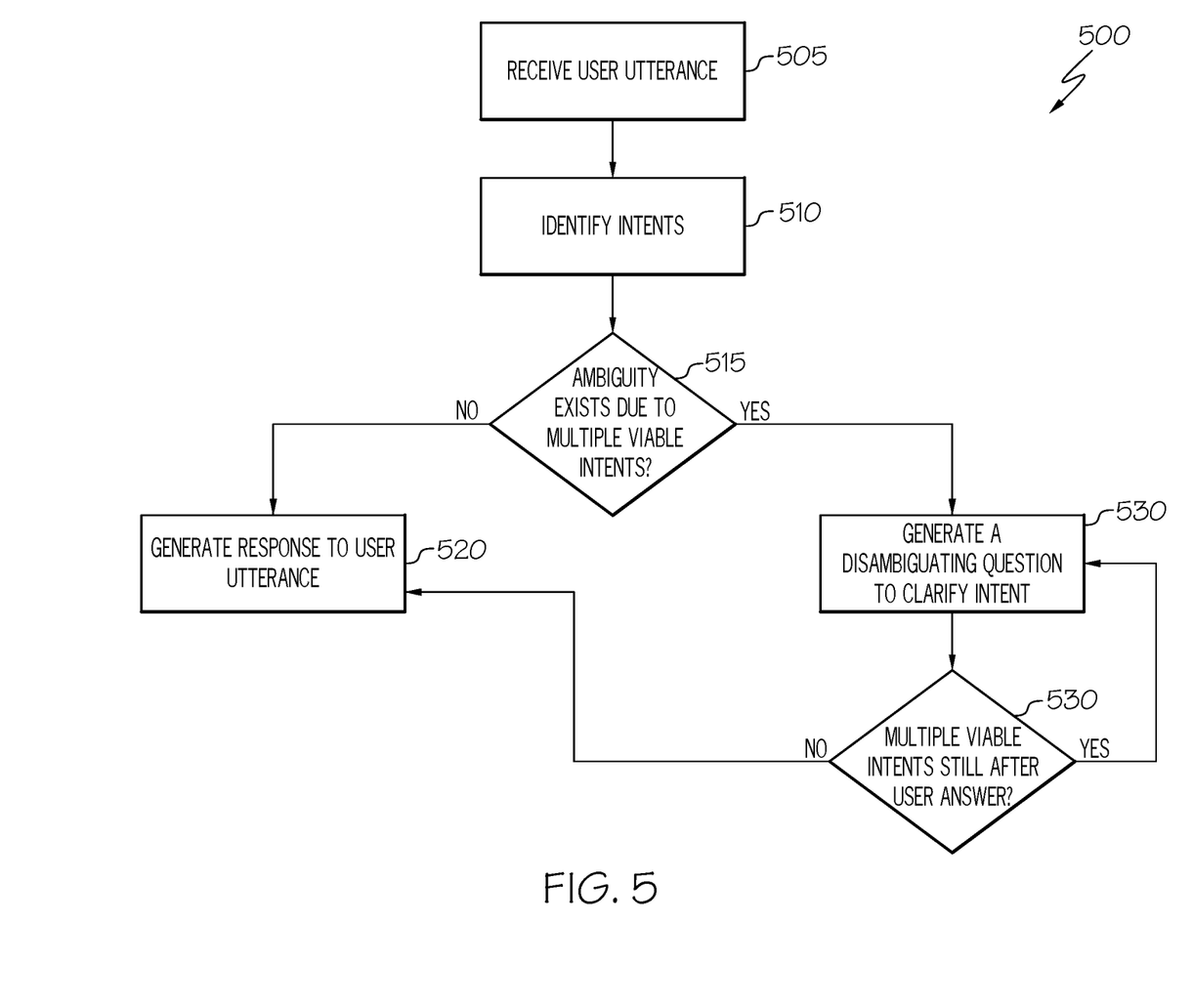
FIG. 5 depicts an example process flowchart for enhancing user input communication with a chatbot according to an embodiment of the present invention.

Referring now to FIG. 5 in conjunction with FIG. 2, a method flow diagram 500 according to an embodiment of the present invention is shown. At 505, communication reception module of system 72, as executed by computer system/server 12, receives a user communication. At 510, intent identification module 92 of system 72, as executed by computer system/server 12, identifies any number of possible intents. At 515, intent identification module 92 determines whether an ambiguity exists in the user communication due to more than one viable intent being identified. If not, at 520, a response is provided to user device 80 for the user communication. At 525, if multiple viable intents are identified, disambiguation module 94 of system 72, as executed by computer system/server 12, generates, based on derived relationships among attributes related to the user communication, a disambiguation question to clarify user intent. At 530, a determination is made as to whether an ambiguity still exists after the user's response to the disambiguation question. If not, at 520, a response is provided to user device 80 for the user communication. If an ambiguity still exists, another disambiguation question is generate to clarify user intent, at 525. The process continues until a single intent is identified and an appropriate response is provided to the user.

The flowchart of FIG. 5 illustrate the architecture, functionality, and operation of possible implementations of systems, methods, and computer program products according to various embodiments of the present invention. In this regard, each block in the flowcharts may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for enhancing user communication with a chatbot, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for providing a response to a user communication using a chatbot application. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for enhancing user communication with a chatbot. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for enhancing user communication with a chatbot. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for enhancing user communication with a chatbot, comprising:
   receiving a user communication at a chatbot that simulates human conversation and dialogue;

identifying one or more intents related to the user communication;

extracting a plurality of attributes associated with the user communication;

identifying, when an ambiguity in the user communication exists, a plurality of relationships between the extracted attributes using a co-occurrence graph, the co-occurrence graph being a crowd-sourced set of relationships between synonymous terms obtained from a set of training conversations;

determining, in an event that a single intent cannot be ascertained from the co-occurrence graph, an exact relationship between the extracted attributes using an ontology graph that is built based on the co-occurrence graph and continuously updated in response to ongoing evolution of the co-occurrence graph and that contains a set of rules that explicitly encode relationships between the terms; and generating, based on the plurality of relationships, a disambiguating question that is automatically created from the crowd-sourced set of relationships in the co-occurrence graph and communicated to the user by the chatbot to clarify a user intent of the user communication.

2. The computer-implemented method of claim 1, further comprising identifying an ambiguity exists in the user communication when more than one viable intent is found.

3. The computer-implemented method of claim 2, wherein a viable intent includes an intent having a confidence score exceeding a predefined threshold value.

4. The computer-implemented method of claim 1, further comprising deriving, based on a user answer to the disambiguating question, an actual user intent.

5. The computer-implemented method of claim 4, further comprising generating, when the actual intent is not derived, another disambiguation question to clarify the user intent.

6. The computer-implemented method of claim 1, further comprising:

combining the extracted attributes with new input from evolution of an underlying text corpus and from extracted attributes derived from other new user communications received by the chatbot from other users to update the set of relationships in the co-occurrence graph automatically;

building an updated co-occurrence graph by capturing pairs of co-occurring entities in the new entities along with a probability of occurrence;

using a language model to determine whether the pair of co-occurring entities make linguistic sense and to determine weights on edges of the updated co-occurrence graph;

automatically generating a relationship hypothesis based on a new co-occurrence pattern in the updated set of relationships in the updated co-occurrence graph;

building, based on the relationship hypothesis, an algorithm that extracts new synonymy relationships of the updated set of relationships from the updated co-occurrence graph; and adding the new synonymy relationships extracted from the updated co-occurrence graph to the ontology graph.

7. The computer-implemented method of claim 1, wherein the user communication is a voice input in a natural language format.

8. A computer program product for enhancing user communication with a chatbot, the computer program product comprising a computer readable storage media, and program instructions stored on the computer readable storage media, that cause at least one computer device to:

receive a user communication at a chatbot that simulates human conversation and dialogue;

identify one or more intents related to the user communication;

extract a plurality of attributes associated with the user communication;

identify, when an ambiguity in the user communication exists, a plurality of relationships between the extracted attributes using a co-occurrence, the co-occurrence graph being a crowd-sourced set of relationships between synonymous terms obtained from a set of training conversations;

determine, in an event that a single intent cannot be ascertained from the co-occurrence graph, an exact relationship between the extracted attributes using an ontology graph that is built based on the co-occurrence graph and continuously updated in response to ongoing evolution of the co-occurrence graph and that contains a set of rules that explicitly encode relationships between the terms; and generate, based on the plurality of relationships, a disambiguating question that is automatically created from the crowd-sourced set of relationships in the co-occurrence graph and communicated to the user by the chatbot to clarify a user intent of the user communication.

9. The computer program product of claim 8, the instructions further causing the at least one computer device to identify an ambiguity exists in the user communication when more than one viable intent is found.

10. The computer program product of claim 9, wherein a viable intent includes an intent having a confidence score exceeding a predefined threshold value.

11. The computer program product of claim 8, the instructions further causing the at least one computer device to derive, based on a user answer to the disambiguating question, an actual user intent.

12. The computer program product of claim 11, the instructions further causing the at least one computer device to present the disambiguation question to a user associated with the user communication.

13. The computer program product of claim 8, the instructions further causing the at least one computer device to:

combine the extracted attributes with new input from evolution of an underlying text corpus and from extracted attributes derived from other new user communications received by the chatbot from other users to update the set of relationships in the co-occurrence graph automatically;

build an updated co-occurrence graph by capturing pairs of co-occurring entities in the new entities along with a probability of occurrence;

use a language model to determine whether the pair of co-occurring entities make linguistic sense and to determine weights on edges of the updated co-occurrence graph;

automatically generate a relationship hypothesis based on a new co-occurrence pattern in the updated set of relationships in the updated co-occurrence graph;

build, based on the relationship hypothesis, an algorithm that extracts new synonymy relationships of the updated set of relationships from the updated co-occurrence graph; and add the new synonymy relationships extracted from the updated co-occurrence graph to the ontology graph.

14. The computer program product of claim 11, the instructions further causing the at least one computer device to generate, based on the actual user intent, a response to the user communication.

15. A computer system for enhancing user communication with a chatbot, comprising:
a memory medium comprising instructions;
a bus coupled to the memory medium; and
a processor coupled to the bus that when executing the instructions causes the system to:
receive a user communication at a chatbot that simulates human conversation and dialogue;
identify one or more intents related to the user communication;
extract a plurality of attributes associated with the user communication;
identify, when an ambiguity in the user communication exists, a plurality of relationships between the extracted attributes using a co-occurrence graph, the co-occurrence graph being a crowd-sourced set of relationships between synonymous terms obtained from a set of training conversations;
determine, in an event that a single intent cannot be ascertained from the co-occurrence graph, an exact relationship between the extracted attributes using an ontology graph that is built based on the co-occurrence graph and continuously updated in response to ongoing evolution of the co-occurrence graph and that contains a set of rules that explicitly encode relationships between the terms; and
generate, based on the plurality of relationships, a disambiguating question that is automatically created from the crowd-sourced set of relationships in the co-occurrence graph and communicated to the user by the chatbot to clarify a user intent of the user communication.

16. The computer system of claim 15, the instructions further causing the system to identify an ambiguity exists in the user communication when more than one viable intent is found.

17. The computer system of claim 16, wherein a viable intent includes an intent having a confidence score exceeding a predefined threshold value.

18. The computer system of claim 15, the instructions further causing the system to derive, based on a user answer to the disambiguating question, an actual user intent.

19. The computer system of claim 15, the instructions further causing the system to generate, when the actual intent is not derived, another disambiguation question to clarify the user intent.

20. The computer system of claim 15, the instructions further causing the system to:
combine the extracted attributes with new input from evolution of an underlying text corpus and from extracted attributes derived from other new user communications received by the chatbot from other users to update the set of relationships in the co-occurrence graph automatically;
build an updated co-occurrence graph by capturing pairs of co-occurring entities in the new entities along with a probability of occurrence;
use a language model to determine whether the pair of co-occurring entities make linguistic sense and to determine weights on edges of the updated co-occurrence graph;
automatically generate a relationship hypothesis based on a new co-occurrence pattern in the updated set of relationships in the updated co-occurrence graph;
build, based on the relationship hypothesis, an algorithm that extracts new synonymy relationships of the updated set of relationships from the updated co-occurrence graph; and
add the new synonymy relationships extracted from the updated co-occurrence graph to the ontology graph.

* * * * *